(12) United States Patent
Lorenzo et al.

(10) Patent No.: US 11,890,785 B2
(45) Date of Patent: Feb. 6, 2024

(54) PROCESS FOR MANUFACTURING FULLY RECYCLABLE MINING SCREENS

(71) Applicant: Covestro LLC, Pittsburgh, PA (US)

(72) Inventors: Michael Lorenzo, Sewickley, PA (US); Jean Paul Rodrigues, Chateauneuf-sur-Isere (FR)

(73) Assignee: COVESTRO LLC, Pittsburgh, PA (US)

( * ) Notice: Subject to any disclaimer, the term of this patent is extended or adjusted under 35 U.S.C. 154(b) by 320 days.

(21) Appl. No.: 17/297,619

(22) PCT Filed: Dec. 17, 2019

(86) PCT No.: PCT/US2019/066810
§ 371 (c)(1),
(2) Date: May 27, 2021

(87) PCT Pub. No.: WO2020/131850
PCT Pub. Date: Jun. 25, 2020

(65) Prior Publication Data
US 2022/0023916 A1 Jan. 27, 2022

Related U.S. Application Data

(60) Provisional application No. 62/781,650, filed on Dec. 19, 2018.

(51) Int. Cl.
B29B 17/04 (2006.01)
B29B 17/00 (2006.01)
(Continued)

(52) U.S. Cl.
CPC ........ *B29B 17/0404* (2013.01); *B07B 1/4618* (2013.01); *B29B 17/0042* (2013.01);
(Continued)

(58) Field of Classification Search
CPC ....... B07B 1/46; B07B 1/4609; B07B 1/4618; B07B 1/185; B01D 21/283; B01D 29/19; B29B 17/0404; B29B 7/90
(Continued)

(56) References Cited

U.S. PATENT DOCUMENTS 4,247,007 A * 1/1981 Kai .......................... B07B 1/46
209/400
4,295,918 A 10/1981 Benson et al.
(Continued)

FOREIGN PATENT DOCUMENTS

AU 733519 B2 * 9/1998
AU 733519 B2 5/2001
(Continued)

OTHER PUBLICATIONS

International Search Report, PCT/US2019/066810, dated Mar. 30, 2020, Authorized officer: Markus Eigner.

*Primary Examiner* — Terrell H Matthews
(74) *Attorney, Agent, or Firm* — Richard P. Bender; John E. Mrozinski, Jr.

(57) ABSTRACT

The present invention provides an environmentally-friendly, fully recyclable composite mining screen which has sufficient rigidity to replace existing metal and metal covered plastic mining screens. The inventive composite screen insert contains stiff reinforcing fibers (glass, carbon, etc.) and exhibits the rigidity of metal and metal-covered plastic mining screen inserts so as to minimize deflection in use. The inventive mining screen is also completely recyclable because at the end of its useful life, the broken and used screen can be ground into polymer particles and the particles incorporated into new screens or other parts.

20 Claims, 5 Drawing Sheets

(51) Int. Cl.
*B07B 1/46* (2006.01)
*C08K 7/14* (2006.01)
*B29C 39/10* (2006.01)
*B29K 105/26* (2006.01)
*B29K 309/08* (2006.01)
*B29L 31/00* (2006.01)
*B29C 70/54* (2006.01)

(52) U.S. Cl.
CPC ............ *C08K 7/14* (2013.01); *B29B 17/0412* (2013.01); *B29C 39/10* (2013.01); *B29C 70/54* (2013.01); *B29K 2105/26* (2013.01); *B29K 2309/08* (2013.01); *B29L 2031/737* (2013.01)

(58) Field of Classification Search
USPC ......................................................... 209/263
See application file for complete search history.

(56) References Cited

U.S. PATENT DOCUMENTS

| | | | |
|---|---|---|---|
| 4,374,169 | A | 2/1983 | Gryskiewicz et al. |
| 5,254,405 | A | 10/1993 | Panaroni et al. |
| 5,717,091 | A | 2/1998 | Richter et al. |
| 6,403,702 | B1 | 6/2002 | Markusch et al. |
| 6,667,370 | B1 | 12/2003 | Wershofen et al. |
| 9,409,209 | B2 * | 8/2016 | Wojciechowski ...... B29C 65/16 |
| 2014/0262978 | A1 | 9/2014 | Wojciechowski |
| 2018/0312667 | A1 | 11/2018 | Colgrove et al. |

FOREIGN PATENT DOCUMENTS

| | | | | |
|---|---|---|---|---|
| WO | WO-2015168516 | A2 * | 11/2015 | ............... B07B 1/46 |
| WO | WO-2018201043 | A2 * | 11/2018 | ........... B01D 21/283 |

* cited by examiner

PROCESS FOR MANUFACTURING FULLY RECYCLABLE MINING SCREENS

CROSS REFERENCE TO RELATED APPLICATION

This application is a national stage application under 35 U.S.C. § 371 of PCT/US2019/066810, filed Dec. 17, 2019, which claims the benefit of U.S. Provisional Application Ser. No. 62/781,650, filed Dec. 19, 2018, the entire contents of each of which are incorporated herein by reference.

FIELD OF THE INVENTION

The present invention relates in general to mining, and more specifically to fully recyclable, polymer composite mining screens and inserts.

BACKGROUND OF THE INVENTION

In the mining industry, screening systems are used to separate pieces of material by size. Such screening systems generally include a number of screen panels (inserts) which rest on a framework of steel supports. As the supports are jostled and moved around, fine material on the screen panels drops through the openings in the screen, whilst larger pieces of material bounce off the screens and off the sides of the screening system. Those larger pieces are collected for further processing.

Due to the abrasive nature of the materials contacting the screens, e.g., ores, rocks, stones, the screens have a limited lifespan ranging from approximately one to six months. When a screen breaks, the panel must be replaced with a new one and the broken one is discarded. Mining sites can rapidly accumulate these broken, discarded screens depending on the operation and material being mined. One of the problems in the mining industry, therefore, is the accumulation of used mining screens which cannot be disposed of in an environmentally friendly manner or preferably, recycled and reused.

Mining screen panels are typically made of steel wire, rods, or strips, which may be covered with a plastic resin to help reduce abrasion damage (See, U.S. Pat. Nos. 4,295,918 and 4,374,169). Due to the combination of materials making up these steel-reinforced plastic screens, recycling may be difficult and expensive. Further, given that mines are typically located in remote locations far from any recycling facility, it may not be economical or feasible to transport such heavy, metallic and plastic screens to a recycling location.

Some attempts have been made in the art to lightweight the screen panels by producing them from plastics, such as polyethylene or polyurethane. One of the drawbacks to making mining screens and inserts from plastic is the material's lack of rigidity or stiffness. Such stiffness minimizes the deflection of the screen under the weight of the rocks being sorted.

To reduce or eliminate problems, therefore, a need exists in the art for a mining screen and insert which would combine stiffness with light weight and be fully recyclable.

SUMMARY OF THE INVENTION

Accordingly, the present invention reduces or eliminates problems inherent in the art by providing an environmentally-friendly, fully recyclable polymer composite mining screen and insert which has sufficient rigidity to replace existing metal and metal covered plastic mining screens. The inventive polymer composite screen contains stiff reinforcing fibers (glass, carbon, etc.) and exhibits the rigidity of metal and metal-covered plastic mining screens so as to minimize deflection in use. The inventive mining screen and insert are also completely recyclable because at the end of their useful lives, the broken and used screen and insert can be ground into particles and the particles incorporated into new screen inserts or other parts.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
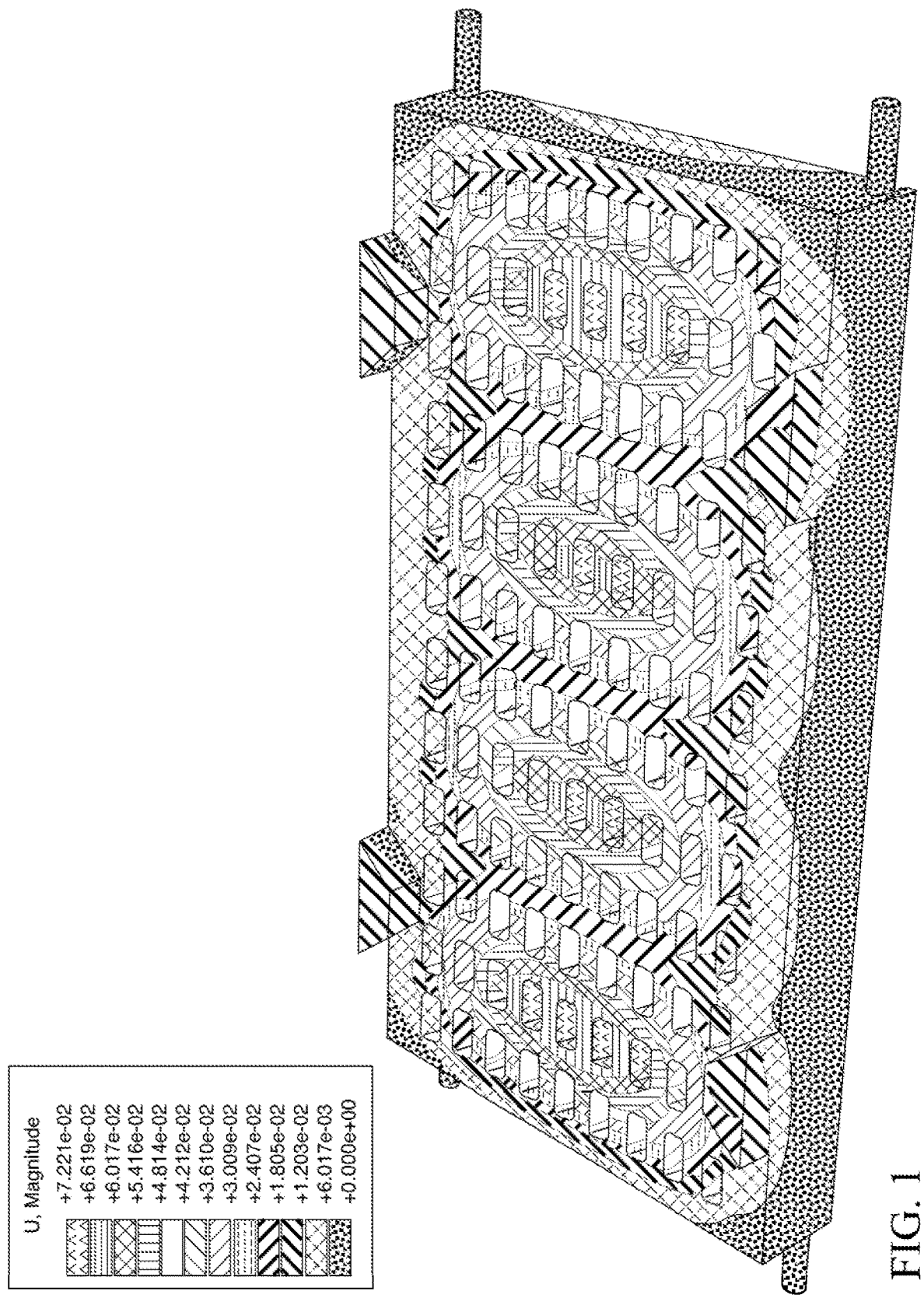
FIG. 1 shows the magnitude of deflection by the prior art steel and composite mining screen.

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

In a first aspect, the present invention is directed to a composite mining screen comprising a cast elastomer frame encapsulating a composite mining screen insert, wherein the insert contains up to 85 wt. % fibrous reinforcing material, based on the weight of the insert, and wherein a polyol component of the cast elastomer contains polymer regrind.

In another aspect, the present invention is directed to a process of producing the composite mining screen according to the preceding paragraph, the process comprising: placing a composite insert into a mining screen mold sized and shaped to receive the insert; adding regrind polymer to a polyol component of a cast elastomer solution, filling the mold with the cast elastomer solution and encapsulating the insert in the cast elastomer solution; curing the cast elastomer solution to form a new composite mining screen.

In yet another aspect, the present invention is directed to a method of recycling a polymer composite mining screen, the method comprising grinding the used polymer composite mining screen of the previous two paragraphs into regrind polymer particles; coating a fibrous reinforcing material with a liquid polymer mixture; pulling the fibrous reinforcing material with coating applied thereto through a pultrusion die; cutting and curing the fibrous reinforcing material to form a new polymer composite mining screen insert; placing the new polymer composite mining screen insert into a mining screen mold sized and shaped to receive the insert; adding the regrind particles to a polyol component of a liquid cast elastomer solution; filling the mining screen mold with a cast elastomer solution and encapsulating the insert in the cast elastomer; and curing the cast elastomer to form a new composite mining screen.

As used herein, the term "polymer" encompasses pre-polymers, oligomers and both homopolymers and copolymers; the prefix "poly" in this context referring to two or more. As used herein, the term "molecular weight", when used in reference to a polymer, refers to the number average molecular weight (Mn), unless otherwise specified.

Suitable polymers for use in the invention include, but are not limited to, thermoplastic polymers such as polycarbonate (PC), co-polycarbonate (co-PC), polyestercarbonate, copolyestercarbonate, siloxane-polycarbonate, siloxane-co-polycarbonate, polyester, co-polyester, polyvinyl chloride (PVC), co-polyvinyl chloride (co-PVC), polymethylmethacrylate (PMMA), co-polymethylmethacrylate (co-PMMA), polypropylene (PP), cyclic olefin copolymer (COC), fluoropolymers, thermoplastic olefin (TPO), styrene acrylonitrile (SAN), thermoplastic polyurethane (TPU) or blends of these materials.

In various embodiments, the cast elastomer may be selected from polyurethane, thermoplastic polyurethane, natural rubber, neoprene rubber, styrene-butadiene rubber, and acrylonitrile butadiene rubber.

In certain embodiments, the mining screen and insert are made of thermoplastic polyurethane. Thermoplastic polyurethanes contain:
(A) an organic polyisocyanate,
(B) a chain lengthening agent with a molecular weight below 400, preferably below 250, containing a hydroxyl group and/or amine group, and
(C) as an optional ingredient, up to 80% by weight, preferably less than 50% by weight, based on the total amount of (A), (B), and (C), of substantially linear polyols having molecular weights in the range of from 400 to 10,000, preferably from 450 to 6,000.

The ratio of isocyanate groups of component (A) to Zerewitinoff active groups of components (B) and (C) is in the range of from 0.90:1 to 1.2:1, preferably from 0.95:1 to 1.10:1.

As used herein, the term "polyisocyanate" refers to compounds comprising at least two unreacted isocyanate groups, such as three or more unreacted isocyanate groups. The polyisocyanate useful in the invention may comprise diisocyanates such as linear aliphatic polyisocyanates, cycloaliphatic polyisocyanates and alkaryl polyisocyanates.

Suitable polyisocyanates include, for example, low molecular weight polyisocyanates having a molecular weight of 168 to 300, such as hexamethylene diisocyanate (HDI), pentamethylene diisocyanate (PDI), 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, methylene dicyclohexyl diisocyanate or hydrogenated MDI (HMDI). In certain embodiments, the aliphatic polyisocyanate is a combination of hexamethylene diisocyanate (HDI) and 1-isocyanato-3,3,5-trimethyl-5-isocyanatomethyl-cyclohexane (IPDI) homopolymers.

In some embodiments, the polyisocyanate comprises a derivative of any of the foregoing monomeric polyisocyanates, such as a derivative containing one or more of biuret groups, isocyanurate groups, urethane groups, carbodiimide groups, and allophanate groups.

Specific examples of suitable modified polyisocyanates include N,N',N"-tris-(6-isocyanatohexyl)-biuret and mixtures thereof with its higher homologues and N,N',N"-tris-(6-isocyanatohexyl)-isocyanurate and mixtures thereof with its higher homologues containing more than one isocyanurate ring.

Isocyanate group-containing prepolymers and semi-prepolymers based on the monomeric simple or modified polyisocyanates exemplified above and organic polyhydroxyl compounds are also suitable for use as a polyisocyanate in the present invention. These prepolymers and semi-prepolymers often have an isocyanate content of 0.5% to 30% by weight, such as 1% to 20% by weight or 10% to 20% by weight, and can be prepared, for example, by reaction of polyisocyanate(s) with polyhydroxyl compound(s) at an NCO/OH equivalent ratio of 1.05:1 to 10:1, such as 1.1:1 to 3:1, this reaction may be followed by distillative removal of any unreacted volatile starting polyisocyanates still present.

The prepolymers and semi-prepolymers may be prepared, for example, from low molecular weight polyhydroxyl compounds having a molecular weight of 62 to 299, specific examples of which include, but are not limited to, ethylene glycol, propylene glycol, trimethylol propane, 1,6-dihydroxy hexane; low molecular weight, hydroxyl-containing esters of these polyols with dicarboxylic acids; low molecular weight ethoxylation and/or propoxylation products of these polyols; and mixtures of the preceding polyvalent modified or unmodified alcohols.

In certain embodiments, the prepolymers and semi-prepolymers are prepared from a relatively high molecular weight polyhydroxyl compound having a molecular weight of 300 to 8,000, such as 1,000 to 5,000, as determined from the functionality and the OH number. These polyhydroxyl compounds have at least two hydroxyl groups per molecule and generally have a hydroxyl group content of 0.5% to 17% by weight, such as 1% to 5% by weight.

Examples of suitable relatively high molecular weight polyhydroxyl compounds which may be used for the preparation of the prepolymers and semi-prepolymers include polyester polyols based on the previously described low molecular weight, monomeric alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Hydroxyl group-containing polylactones, especially poly-ε-caprolactones, are also suitable for the preparation of the prepolymers and semi-prepolymers.

Polyether polyols, which can be obtained by the alkoxylation of suitable starting molecules, are also suitable for the preparation of the isocyanate group-containing prepolymers and semi-prepolymers. Examples of suitable starting molecules for the polyether polyols include the previously described monomeric polyols, water, organic polyamines having at least two NH bonds and any mixtures of these starting molecules. Ethylene oxide and/or propylene oxide are exemplary suitable alkylene oxides for the alkoxylation reaction. These alkylene oxides may be introduced into the alkoxylation reaction in any sequence or as a mixture.

Also suitable for the preparation of the prepolymers and semi-prepolymers are hydroxyl group-containing polycarbonates which may be prepared by the reaction of the previously described monomeric diols with phosgene and diaryl carbonates such as diphenyl carbonate.

In certain embodiments, the polyisocyanate comprises an asymmetric diisocyanate trimer (iminooxadiazine dione ring structure) such as, for example, the asymmetric diisocyanate trimers described in U.S. Pat. No. 5,717,091, which is incorporated by reference into this specification. In certain embodiments, the polyisocyanate comprises an asymmetric diisocyanate trimer based on hexamethylene diisocyanate (HDI), 1-isocyanato-3,3,5-trimethyl-5-isocyanatomethyl-cyclohexane (IPDI); or a combination thereof.

The compositions useful in the present invention may also comprise a polymeric polyol. As will be appreciated, the polymeric polyol is distinct from, and in addition to, any polymeric polyol that may be used to prepare an isocyanate group-containing prepolymer or semi-prepolymer described above with respect to the polyisocyanate. In certain embodiments, the polymeric polyol comprises acid, such as carboxylic acid, functional groups.

Polymeric polyols suitable for use in various embodiments of the invention include polyester polyols, polyether polyols, and polycarbonate polyols, such as those described above with respect to the preparation of isocyanate group-containing prepolymers or semi-prepolymers.

In certain embodiments of the present invention, the polymeric polyol comprises an acrylic polyol, including acrylic polyols that contain acid, such as carboxylic acid, functional groups. Acrylic polyols suitable for use in the compositions of the present invention include hydroxyl-containing copolymers of olefinically unsaturated compounds, such as those polymers that have a number average molecular weight (Mn) determined by vapor pressure or membrane osmometry of 800 to 50,000, such as 1,000 to 20,000, or, in some cases, 5,000 to 10,000, and/or having a hydroxyl group content of 0.1 to 12% by weight, such as 1 to 10% by weight and, in some cases, 2 to 6% by weight and/or having an acid value of at least 0.1 mg KOH/g, such as at least 0.5 mg KOH/g and/or up to 10 mg KOH/g or, in some cases, up to 5 mg KOH/g.

Often, the copolymers are based on olefinic monomers containing hydroxyl groups and olefinic monomers which are free from hydroxyl groups. Examples of suitable olefinic monomers that are free of hydroxyl groups include vinyl and vinylidene monomers, such as styrene, α-methyl styrene, o- and p-chloro styrene, o-, m- and p-methyl styrene, p-tert-butyl styrene; acrylic acid; methacrylic acid; (meth)acrylonitrile; acrylic and methacrylic acid esters of alcohols containing 1 to 8 carbon atoms, such as ethyl acrylate, methyl acrylate, n- and iso-propyl acrylate, n-butyl acrylate, 2-ethylhexyl acrylate, 2-ethylhexyl methacrylate, iso-octyl acrylate, methyl methacrylate, ethyl methacrylate, butyl methacrylate and iso-octyl methacrylate; diesters of fumaric acid, itaconic acid or maleic acid having four to eight carbon atoms in the alcohol component; (meth)acrylic acid amide; and vinyl esters of alkane monocarboxylic acids having two to five carbon atoms, such as vinyl acetate or vinyl propionate.

Examples of suitable olefinic monomers containing hydroxyl groups are hydroxyalkyl esters of acrylic acid or methacrylic acid having two to four carbon atoms in the hydroxyalkyl group, such as 2-hydroxyethyl(meth)acrylate, 2-hydroxypropyl(meth)acrylate, 4-hydroxybutyl(meth)acrylate and trimethylolpropane-mono- or pentaerythritomono-(meth)acrylate. Mixtures of the monomers exemplified above may also be used for the preparation of the acrylic polyol. As will be appreciated, (meth)acrylate and (meth)

acrylic is meant to encompass methacrylate and acrylate or methacrylic and acrylics, as the case may be. Mixtures of the various polymeric polyols described above may be used.

The substantially linear polyols (C) with molecular weights ranging from 400 to 10,000, in some embodiments from 450 to 6,000 which may be used according to the invention include virtually all known polyesters, polylactones, polyethers, polythioethers, polyester amides, polycarbonates, polyacetals and vinylpolymers. It is preferred that substantially linear polyols (C) have two Zerewitinoff active groups (principally hydroxyl groups), although minor quantities of such compounds containing three Zerewitinoff active groups may also be included. Examples of such polyols include polybutadiene diols, polyhydroxyl compounds already containing urethane or urea groups, modified or unmodified natural polyols, and compounds containing other Zerewitinoff active groups, such as amine, carboxyl or thiol groups. In the process according to the invention, it is preferred to use hydroxyl-containing polyesters of glycols and adipic acid, phthalic acid and/or terephthalic acid and their hydrogenation products, hydroxyl polycarbonates, polycaprolactones, polyethylene oxide, polypropylene oxide, polytetrahydrofuran and mixed polymers of ethylene oxide and propylene oxide.

Any chain lengthening agents (B) may be used according to the invention including those known and described in the art. These include low molecular polyhydric alcohols (preferably glycols), polyamines, hydrazines and hydrazides. Amino alcohols such as ethanolamine, diethanolamine, N-methyldiethanolamine, triethanolamine and 3-aminopropanol may also be used according to the invention. Preferred chain lengthening agents include monoethylene glycol (MEG), ethylene glycol; di- and triethylene glycol; 1,2-propane diol; 1,3- and 1,4-butane diol; 1,6-hexane diol; 2-ethyl hexane diol(1,3), 2,2-dimethyl propane diol; 1,4-bis-hydroxy methyl cyclohexane and hydroquinone bis(2-hydroxyethyl) ether (HQEE). The following are particularly preferred: ethylene glycol, diethylene glycol, 1,4-butane diol and 1,6-hexane diol.

The composite mining screen insert of the invention is preferably made by pultrusion. Pultrusion is a manufacturing process for producing continuous lengths of fiber reinforced plastic ("FRP") structural shapes. Raw materials include a liquid resin mixture (containing resin, fillers and specialized additives) and reinforcing fibers. The process involves pulling these raw materials, rather than pushing as is the case in extrusion, through a heated steel forming die using a continuous pulling device. The reinforcement materials are in continuous forms such as rolls of fiberglass mat or doffs of fiberglass roving. The two ways to impregnate, or "wet out", the glass are open bath process and resin injection. Typical commercial resins include polyesters, vinyl esters, phenolics, and epoxy compounds. These resins usually have very long gel times and can be run in an open bath process wherein the reinforcing fibers are soaked in a bath of resin and the excess resin is scraped off by a series of preform plates and at the die entrance. As the wetted fibers enter the die, the excess resin is squeezed through and off the reinforcing fibers. The pressure rise in the die inlet helps to enhance fiber wet-out and suppresses void formation. As the saturated reinforcements are pulled through the die, the gelation (or hardening) of the resin is initiated by the heat from the die and a rigid, cured profile is formed that corresponds to the shape of the die.

For resin systems like polyurethanes, which have a fast gel time and a short pot life, the resin injection process is used. In the injection process, the reinforcement materials are passed through a small closed box which is usually attached to the die or may be part of the die. The resin is injected, under pressure through ports in the box, to impregnate the reinforcement materials. Resin injection boxes are designed to minimize resin volume and resin residence time inside the box. There are a number of different resin injection box designs in the literature all of which have the common features of an angled or tapered design and the exit profile matching the shape of the die entrance.

A long fiber based reinforcing material is necessary to provide mechanical strength to the pultruded composite of the invention, and to allow the transmission of the pulling force in the process. Fibers should preferably be at least long enough to pass though both the impregnation and curing dies and attach to a source of tension. In various embodiments of the invention, the fibrous reinforcing material is made of any fibrous material or materials that can provide long fibers capable of being at least partially wetted by the polyurethane formulation during impregnation. The fibrous reinforcing material may be single strands, braided strands, woven or non-woven mat structures and combinations thereof. Mats or veils made of long fibers may be used, in single ply or multi-ply structures.

Suitable fibrous materials are known in the pultrusion art, include, but are not limited to, glass fibers, glass mats, carbon fibers, polyester fibers, natural fibers, aramid fibers, nylon fibers, basalt fibers and combinations thereof. In some embodiments of the invention the fibrous reinforcing materials are long glass fibers. In various embodiments, the fibers and/or fibrous reinforcing structures may be formed continuously from one or more reels feeding into the pultrusion apparatus and attached to a source of pulling force at the outlet side of the curing die. In certain embodiments, the reinforcing fibers may optionally be pre-treated with sizing agents or adhesion promoters known to those skilled in the art.

The weight percentage of the long fiber reinforcement in the pultruded composites may vary considerably, depending on the end use application intended for the composite articles. In various embodiments of the invention, reinforcement loadings may be from 30% to 85% by weight, in some embodiments from 40% to 85% by weight of the final composite, in certain other embodiments from 60 to 80% by weight, and in various other embodiments from 70% to 80% by weight, based on the weight of the final composite. The long fiber reinforcement may be present in the pultruded composites in an amount ranging between any combination of these values, inclusive of the recited values.

In the polyurethane pultrusion composite, the polyisocyanate component and the isocyanate-reactive component may be the only components fed into the impregnation die in the pultrusion process. The polyisocyanate component or the isocyanate-reactive component may be premixed with any optional additives. However, it is to be understood that the optional additives that are not themselves polyfunctional isocyanate-reactive materials are to be considered (counted) as entities separate from the isocyanate-reactive component, even when mixed therewith. Likewise, if the optional additives, or any part thereof, are premixed with the polyisocyanate component, these are to be considered as entities separate from the polyisocyanate component, except in the case where they are themselves polyfunctional isocyanate species.

The impregnation die preferably provides for adequate mixing of the reactive components and adequate impregnation of the fibrous reinforcing material. The impregnation die may be fitted with a mixing apparatus, such as a static mixer, which provides for mixing of the reactive components before the resulting reaction mixture is used to impregnate the fibrous reinforcing structure. Other types of optional mixing devices known to those skilled in the art include, but are not limited to, high-pressure impingement mixing devices or low pressure dynamic mixers such as rotating paddles. In some embodiments, adequate mixing is provided in the impregnation die itself, without any additional mixing apparatus.

A pultrusion apparatus has at least one impregnation die and at least one curing die. Because no polymerization is to take place in the impregnation die, the curing die necessarily will operate at a higher temperature than the impregnation die. The pultrusion apparatus may optionally contain a plurality of curing dies, or zones. Different curing zones may be set at different temperatures, if desired, but all the zones of the curing die will be higher in temperature than the impregnation die. The pultrusion apparatus may optionally contain a plurality of impregnation dies. In certain embodiments, there is just one impregnation die, and this is situated immediately prior to the first curing die (or zone). As mentioned hereinabove, the impregnation die is set at a temperature that provides for substantially no reaction (polymerization) between the polyisocyanate component and the polyisocyanate-reactive component in the polyurethane-forming formulation before the fibrous reinforcing structure, which has been at least partially impregnated with the polyurethane-forming formulation, enters the first curing die (or zone).

The reaction mixture may optionally contain a catalyst for one or more of the polymer forming reactions of polyisocyanates. Catalyst(s), where used, is/are preferably introduced into the reaction mixture by pre-mixing with the isocyanate-reactive component. Catalysts for the polymer forming reactions of organic polyisocyanates are well known to those skilled in the art. Such catalysts include, but are not limited to, tertiary amines, tertiary amine acid salts, organic metal salts, covalently bound organometallic compounds, and combinations thereof. The levels of the preferred catalysts required to achieve the needed reactivity profile for pultrusion processing will vary with the composition of the formulation and must be optimized for each reaction system (formulation). Such optimization would be well understood by persons of ordinary skill in the art. The catalysts preferably have at least some degree of solubility in the isocyanate-reactive component used, and are most preferably fully soluble in that component at the use levels required.

The pultrusion formulation may contain other optional additives, if desired. Examples of additional optional additives include particulate or short fiber fillers, internal mold release agents, fire retardants, smoke suppressants, dyes, pigments, antistatic agents, antioxidants, UV stabilizers, minor amounts of viscosity reducing inert diluents, combinations of these, and any other known additives from the art. In some embodiments of the present invention, the additives or portions thereof may be provided to the fibers, such as by coating the fibers with the additive.

Internal mold release additives are highly preferred in pultrusion of mixing activated isocyanate-based resins systems to prevent sticking or buildup in the die. Suitable internal mold release agents may include, for example, fatty amides such as erucamide or stearamide, fatty acids such as oleic acid, oleic acid amides, fatty esters such as LOXIOL G71S inert polyester (Henkel), carnuba wax, beeswax (natural esters), butyl stearate, octyl stearate, ethylene glycol monostearate, ethylene glycol distearate, glycerin di-oleate, glycerin tri-oleate, and esters of polycarboxylic acids with long chain aliphatic monovalent alcohols such as dioctyl sebacate, mixtures of (a) mixed esters of aliphatic polyols, dicarboxylic acids and long-chained aliphatic monocarboxylic acids, and (b) esters of the groups: (1) esters of dicarboxylic acids and long-chained aliphatic monofunctional alcohols, (2) esters of long-chained aliphatic monofunctional alcohols and long-chained aliphatic monofunctional carboxylic acids, (3) complete or partial esters of aliphatic polyols and long-chained aliphatic monocarboxylic acids, silicones such as TEGO IMR 412T silicone (Goldschmidt), KEMESTER 5721 ester (a fatty acid ester product from Witco Corporation), fatty acid metal carboxylates such as zinc stearate and calcium stearate, waxes such as montan wax and chlorinated waxes, fluorine containing compounds such as polytetrafluoroethylene, fatty alkyl phosphates (both acidic and non acidic types such as ZELEC UN, ZELEC AN, ZELEC MR, ZELEC VM-, ZELEC UN, ZELECLA-1, and ZELEC LA-2 phosphates, (Stepan Chemical Company), chlorinated-alkyl phosphates; hydrocarbon oils, combinations of these, and the like. Especially preferred internal mold release agents are TECHLUBE 550HB (Technick Products) and 1948MCH (Axel Plastics).

Other preferred optional additives for use in pultrusion include moisture scavengers, such as molecular sieves; defoamers, such as polydimethylsiloxanes; coupling agents, such as the mono-oxirane or organo-amine functional trialkoxysilanes; combinations of these and the like. The coupling agents are particularly preferred for improving the bonding of the matrix resin to the fiber reinforcement. Fine particulate fillers, such as clays and fine silicas, may be used at thixotropic additives. Such particulate fillers may also serve as extenders to reduce resin usage. Fire retardants are sometimes desirable as additives in pultruded composites. Examples of preferred fire retardant types include, but are not limited to, friaryl phosphates; trialkyl phophates, especially those bearing halogens; melamine (as filler); melamine resins (in minor amounts); halogenated paraffins and combinations thereof.

The stoichiometry of mixing isocyanate-based polymer forming formulations, containing an organic polyisocyanate and a polyfunctional isocyanate reactive resin is often expressed by a quantity known in the art as the isocyanate index. The index of such a mixing activated formulation is simply the ratio of the total number of reactive isocyanate (—NCO) groups present to the total number of isocyanate-reactive groups (that can react with the isocyanate under the conditions employed in the process). This quantity is often multiplied by 100 and expressed as a percent. Preferred isocyanate index values in the mixing activated formulations, which are suitable for use in the invention range from 70% to 150%. A more preferred range of index values is from 90% to 125%.

As those skilled in the art are aware, pultrusion of polyurethane and polyisocyanurate systems with fiber reinforced composites is performed by supplying the isocyanate and polyol components to a mix/metering machine for delivery in a desired ratio to a mixing apparatus, preferably a static mixer, to produce a reaction mixture. The reaction mixture is supplied to an injection die where it can be used to impregnate fibers being pulled concurrently into the injection die. The resulting uncured composite is pulled through a zoned heating die, attached directly to the injection die, having a desired cross-section where it is shaped and cured. The curing die has two to three heated zones equipped with electrical heating coils individually controlled to maintain the desired temperatures. The entrance to the die is cooled to prevent premature polymerization. The temperature at the hottest zone generally ranges from about 350° F. (177° C.) to about 450° F. (232° C.). The dynamic forces needed to pull the composite through the forming die are supplied by the pulling machine. This machine typically has gripping devices that contact the cured composite profile (or the glass fibers therein) and give the traction necessary to pull the composite profile through the die. The machine also has a device that develops a force in the desired direction of pull that gives the impetus necessary to pull the composite profile continuously through the die. The resulting composite profile upon exiting the pulling machine is then cut to the desired length typically by an abrasive cut off saw.

The composite mining screen frame may be made of any of the previously mentioned polymers but is preferably a cast polyurethane. Cast polyurethane may be formed using a mold or form with one or more cavities corresponding to the size and shape of the cast polyurethane frame to be formed. The mold may have a substantially flat surface face below which the cavity extends. the component materials of a liquid polyurethane, an isocyanate and a polyol and a chain extender, are mixed and dispensed into the cavity and/or onto the substantially flat surface face of a mold in accordance with the present invention. Various approaches may be used to attain a desired distribution and amount of polyurethane over the face of a mold, including using nozzles having a desired distribution pattern that moves dispensers relative to the face of a mold to dispense polyurethane over the face in a desired pattern. For example, a dispensing nozzle may distribute liquid polyurethane in a predetermined amount, at a predetermined rate, and/or in a predetermined pattern so as to fill the cavity of the mold substantially completely with little or no excess liquid polyurethane beyond the amount needed to fill the cavity.

Polyurethane cast elastomers are made by either a one-shot process, or a prepolymer process. The one-shot process is a single step process in which the isocyanate, diol, amine curing agent, and optional chain extenders are mixed then cured in a mold to form the finished article. Various formulations for producing one-shot cast elastomers are contained for example, in U.S. Pat. No. 6,403,702.

In the two step prepolymer process, a prepolymer is first made by reacting the isocyanate with the diol and, optionally, a chain extending diol to form an isocyanate capped prepolymer. In the second step, this prepolymer is reacted with one or more amine curing agents and, optionally, a chain extending diol to form an isocyanate capped prepolymer. This prepolymer is reacted with one or more amine curing agents and, optionally, additional isocyanate. This mixture is cured in a mold to form the finished cast elastomer article. Cast elastomer articles are preferably post cured to achieve final properties. Additional isocyanate may be added in the second step to adjust the hard segment content of the elastomer, allowing a single prepolymer to be used to make materials with a wide range of hardness.

The term hard segment content refers to the fraction of the composition that consists of the amine curing agent, optional chain extenders, and all of the isocyanate, both from the prepolymer and any added in the final step. The soft segment refers only to the polydiene polymer component. Because the final cast elastomer is crosslinked it is not necessary that the functionality of the polymeric diol or the isocyanate be exactly two. Formulations for producing prepolymers are contained for example, in U.S. Pat. No. 6,667,370.

In various embodiments, the elastomer is a thermoplastic polyurethane. The thermoplastic urethane is either an ester- or ether-based urethane. Other polyurethanes include those selected from the group consisting of polyester, polyether, polycaprolactone, polyoxypropylene, and polycarbonate macroglycol based materials, and mixtures thereof. In various embodiments, the polyurethane is formed of any polyurethane or a methylene diphenyl diisocyanate (MDI) or diisocyanate derivative. Among the useful isocyanates and diisocyanates in the polyurethane include, but are not limited to, isophorone diisocyanate (IPDI), methylene bis 4-cyclohexyl isocyanate (H12MDI), cyclohexyl diisocyanate (CND!), hexamethylene diisocyanate (HDI), m-tetramethyl xylene diisocyanate (m-TMXDI), p-tetramethyl xylene diisocyanate (p-TMXDI), and xylylene diisocyanate (XDI).

In various embodiments, the polyol component of the cast elastomer may include up to 40 wt. % of a polymer regrind, and in selected embodiments, from >0 wt. % to 20 wt. %, in all cases based on the weight of the polyol. In this case, the polyurethane is cut or ground to form smaller particles for processing. Such materials are commonly known in the art as "regrind." The size of the regrind is selected for convenience and ease of use. In various embodiments, the source polyurethane is a combination of polyurethanes having different Shore hardness.

A variety of machines to process regrind polyurethane in a liquid vehicle such as a polyol are available from Baule in the Advanced, Universal, Alpha, and Omega machine series.

The polyurethane regrind source may include broken or used polymer composite mining screens and can include both a virgin material and material that has been recycled at least one time. Such polyurethane composite mining screens previously would have been discarded because of a lack of apparent or easy re-use without cumbersome steps or significant costs. Thus, the present invention helps to eliminate this waste and provide an environmentally-friendly alternative and cost-efficient use for the used and broken mining screens.

In various embodiments, the polyurethane can be a mix of virgin and recycled materials. In some embodiments, the polyurethane may include from 5% to 99% by weight in other embodiments from 55% to 99% by weight of the recycled materials with the remainder being virgin material.

EXAMPLES

The non-limiting and non-exhaustive examples that follow are intended to further describe various non-limiting and non-exhaustive embodiments without restricting the scope of the embodiments described in this specification.

A finite element analysis was conducted on mining screens made from various materials using ABAQUS software and the maximum screen deflection for each is provided in Table I. As is apparent by reference to Table I, the pultruded polyurethane reinforced with 80 wt. % glass fibers had a maximum screen deflection of 0.115 mm which approaches that of steel (0.072 mm).

Figure 2:
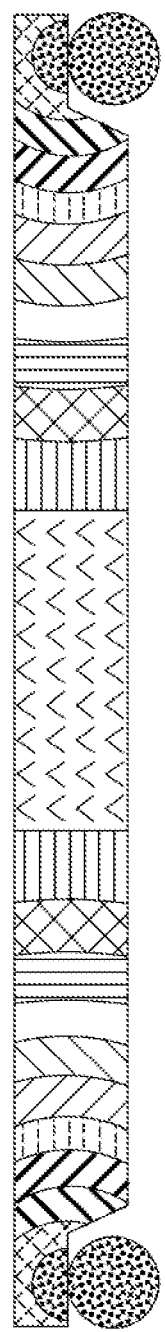
FIG. 2 is a cross sectional view showing the magnitude of deflection in a mining screen insert made of A36 steel.
Figure 2:
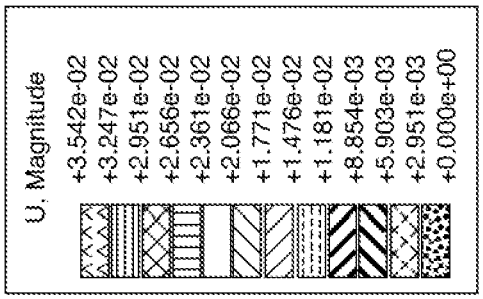
Figure 3:
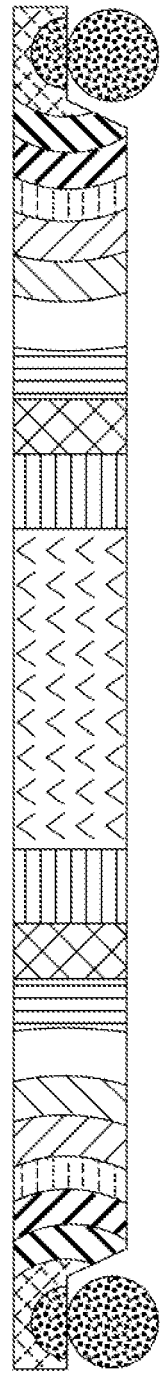
FIG. 3 is a cross sectional view depicting the magnitude of deflection in a mining screen insert made according to the invention of pultruded polyurethane (80% glass/20% polyurethane by weight)
Figure 3:
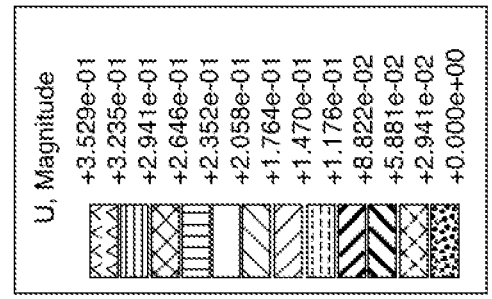
Figure 4:
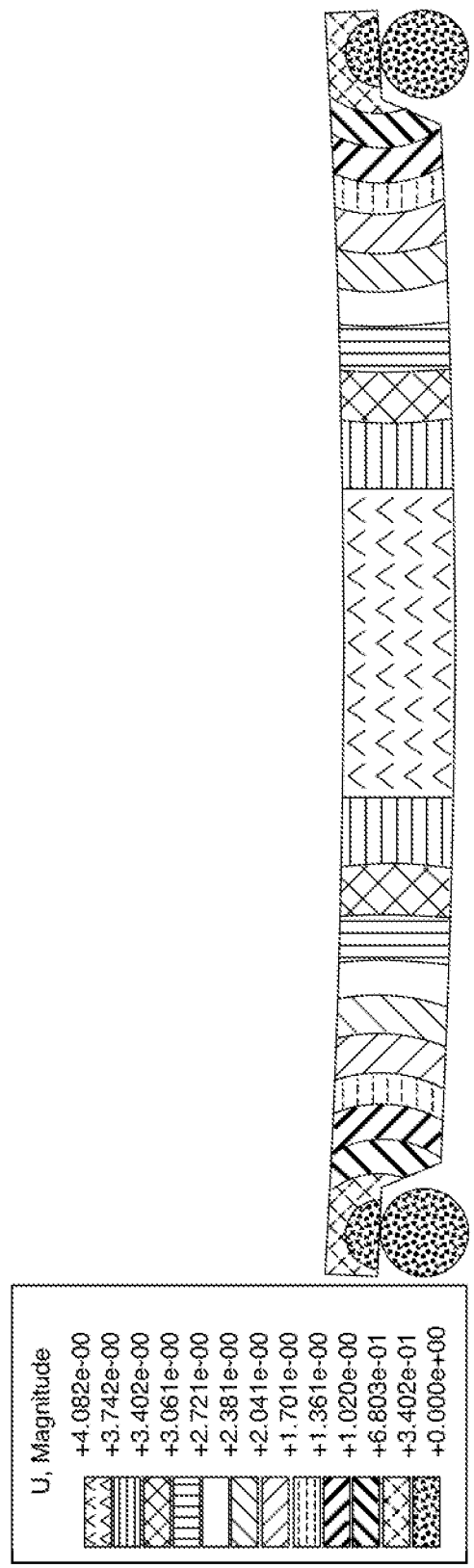
FIG. 4 is a cross sectional view showing the magnitude of deflection in a mining screen insert made of 82 Shore D unfilled polyurethane.

FIG. 1 shows the magnitude of deflection by the prior art steel and composite mining screen inserts. FIG. 2 is a cross sectional view showing the magnitude of deflection in a mining screen insert made of A36 steel. FIG. 3 is a cross sectional view depicting the magnitude of deflection in a composite mining screen insert made according to the invention of pultruded polyurethane (80% glass/20% polyurethane by weight). FIG. 4 is a cross sectional view showing the magnitude of deflection in a mining screen insert made of 82 Shore D unfilled polyurethane.

TABLE I

| Insert material | Maximum screen deflection (mm) under 36 kg load |
| --- | --- |
| A36 Steel | 0.072 |
| 82 Shore D PU (unfilled) | 0.284 |
| PU 35 wt. % long fiber glass | 0.204 |
| PU 50 wt. % long fiber glass | 0.180 |
| Pultruded PU (80 wt. % glass) | 0.115 |

Figure 5:
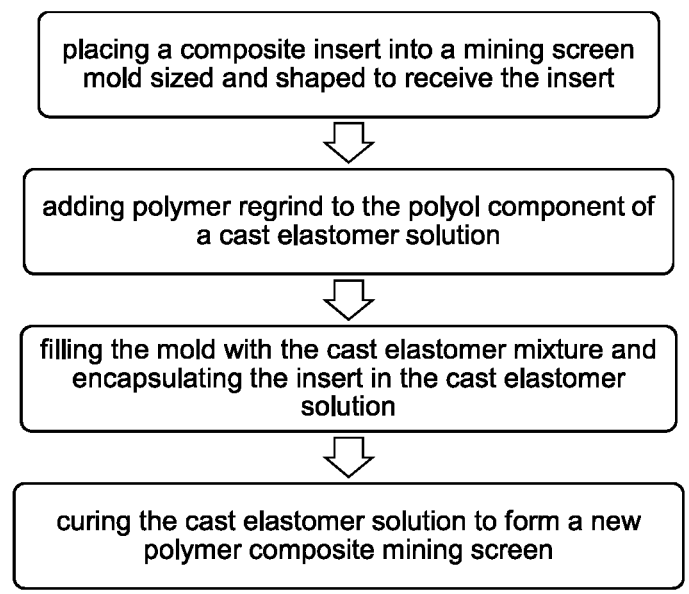
FIG. 5 shows a flow chart of one embodiment of the process of producing the inventive polymer composite mining screen.
Figure 6:
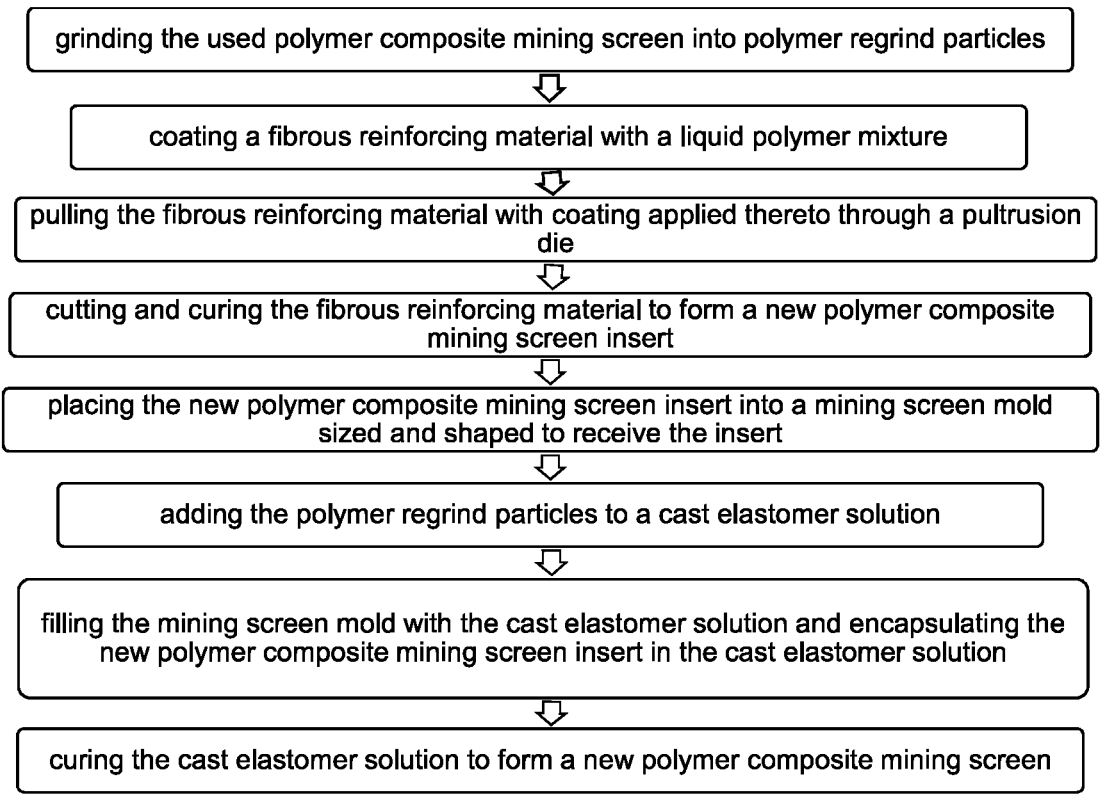
FIG. 6 depicts a flow chart of one embodiment of the recycling process of the invention.

FIG. 5 provides a flow chart of one embodiment of the inventive process of producing a composite mining screen. FIG. 6. is a flow chart depicting one embodiment of the composite mining screen recycling process of the present invention.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following paragraphs:

A composite mining screen comprising a cast elastomer frame encapsulating a composite mining screen insert, wherein the insert contains up to 85 wt. % fibrous reinforcing material, based on the weight of the insert, and wherein a polyol component of the cast elastomer contains polymer regrind.

The composite mining screen according to the previous paragraph, wherein the polymer regrind is selected from the group consisting of polyurethane, polycarbonate (PC), co-polycarbonate (co-PC), polyestercarbonate, copolyestercarbonate, siloxane-polycarbonate, siloxane-copolycarbonate, polyester, co-polyester, polyvinyl chloride (PVC), co-polyvinyl chloride (co-PVC), polymethylmethacrylate (PMMA), co-polymethylmethacrylate (co-PMMA), polypropylene (PP), cyclic olefin copolymer (COC), fluoropolymers, thermoplastic olefin (TPO), styrene acrylonitrile (SAN), thermoplastic polyurethane (TPU), and blends of these materials.

The composite mining screen according to one of the previous two paragraphs, wherein the cast elastomer is selected from the group consisting of polyurethane, thermoplastic polyurethane, natural rubber, neoprene rubber, styrene-butadiene rubber, and acrylonitrile butadiene rubber.

The composite mining screen according to any one of the preceding three paragraphs, wherein the fibrous material is selected from the group consisting of glass fibers, glass mats, carbon fibers, polyester fibers, natural fibers, aramid fibers, nylon fibers, basalt fibers, and combinations thereof.

The composite mining screen according to any one of the preceding four paragraphs, wherein the fibrous material comprises glass fibers.

The composite mining screen according to any one of the preceding five paragraphs, wherein the polyol component of the cast elastomer contains up to 40 wt. % of the polymer regrind, based on the weight of the polyol component.

The composite mining screen according to any one of the preceding six paragraphs, wherein the polyol component of the cast elastomer contains from >0 wt. % to 20 wt. % of the polymer regrind, based on the weight of the polyol component.

The composite mining screen according to any one of the preceding seven paragraphs, wherein the insert contains from 30 wt. % to 85 wt. % of fibrous reinforcing material, based on the weight of the insert.

The composite mining screen according to any one of the preceding eight paragraphs, wherein the composite mining screen insert has a maximum deflection under load comparable to that of a steel mining screen insert.

A process of producing the composite mining screen according to any one of the previous nine paragraphs, the process comprising: placing a composite insert into a mining screen mold sized and shaped to receive the insert; adding polymer regrind to a polyol component of a cast elastomer solution, filling the mold with the cast elastomer solution and encapsulating the insert in the cast elastomer solution; curing the cast elastomer solution to form a new composite mining screen.

The process according to the previous paragraph, wherein the polymer regrind is obtained from a used composite mining screen.

The process according to one of the previous two paragraphs, wherein the polyol component of the cast elastomer contains up to 40 wt. % of the polymer regrind, based on the weight of the polyol component.

The process according to one of the previous three paragraphs, wherein the polyol component of the cast elastomer contains from >0 wt. % to 20 wt. % of the polymer regrind, based on the weight of the polyol component.

The process according to any one of the previous four paragraphs, wherein the polymer regrind is selected from the group consisting of polyurethane, polycarbonate (PC), co-polycarbonate (co-PC), polyestercarbonate, copolyestercarbonate, siloxane-polycarbonate, siloxane-copolycarbonate, polyester, co-polyester, polyvinyl chloride (PVC), co-polyvinyl chloride (co-PVC), polymethylmethacrylate (PMMA), co-polymethylmethacrylate (co-PMMA), polypropylene (PP), cyclic olefin copolymer (COC), fluoropolymers, thermoplastic olefin (TPO), styrene acrylonitrile (SAN), thermoplastic polyurethane (TPU), and blends of these materials.

The process according to any one of the previous five paragraphs, wherein the fibrous reinforcing material is selected from the group consisting of glass fibers, glass mats, carbon fibers, polyester fibers, natural fibers, aramid fibers, nylon fibers, basalt fibers, and combinations thereof.

The process according to any one of the previous six paragraphs, wherein the fibrous reinforcing material comprises glass fibers.

The process according to any one of the previous seven paragraphs, wherein the insert contains up to 85 wt. % of fibrous reinforcing material, based on the weight of the insert.

The process according to any one of the previous eight paragraphs, wherein the insert contains from 30 wt. % to 85 wt. % of fibrous reinforcing material, based on the weight of the insert.

The process according to any one of the previous nine paragraphs, wherein the new composite mining screen insert has a maximum deflection under load comparable to that of a steel mining screen insert.

A method of recycling a composite mining screen, the method comprising grinding the used composite mining screen of any one of the previous paragraphs into polymer regrind particles; coating a fibrous reinforcing material with a liquid polymer mixture; pulling the fibrous reinforcing material with coating applied thereto through a pultrusion die; cutting and curing the fibrous reinforcing material to form a new composite mining screen insert; placing the new composite mining screen insert into a mining screen mold sized and shaped to receive the insert; adding the polymer regrind particles to a polyol component of a cast elastomer solution; filling the mining screen mold with the cast elastomer solution and encapsulating the insert in the cast elastomer solution; and curing the cast elastomer solution to form a new composite mining screen.

The method according to the previous paragraph, wherein the polymer regrind and the liquid polymer are independently selected from the group consisting of polyurethane, polycarbonate (PC), co-polycarbonate (co-PC), polyestercarbonate, copolyestercarbonate, siloxane-polycarbonate, siloxane-copolycarbonate, polyester, co-polyester, polyvinyl chloride (PVC), co-polyvinyl chloride (co-PVC), polymethylmethacrylate (PMMA), co-polymethylmethacrylate (co-PMMA), polypropylene (PP), cyclic olefin copolymer (COC), fluoropolymers, thermoplastic olefin (TPO), styrene acrylonitrile (SAN), thermoplastic polyurethane (TPU), and blends of these materials.

The method according to one of the previous two paragraphs, wherein the cast elastomer is selected from the group consisting of polyurethane, thermoplastic polyurethane, natural rubber, neoprene rubber, styrene-butadiene rubber, and acrylonitrile butadiene rubber.

The method according to any one of the previous three paragraphs, wherein the fibrous material is selected from the group consisting of glass fibers, glass mats, carbon fibers, polyester fibers, natural fibers, aramid fibers, nylon fibers, basalt fibers, and combinations thereof.

The method according to any one of the previous four paragraphs, wherein the fibrous material comprises glass fibers.

The method according to any one of the previous five paragraphs, wherein the polyol component of the cast elastomer contains up to 40 wt. % of polymer regrind, based on the weight of the polyol component.

The method according to the previous six paragraphs, wherein the polyol component of the cast elastomer contains from >0 wt. % to 20 wt. % of the polymer regrind, based on the weight of the polyol component.

The method according to any one of the previous seven paragraphs, wherein the insert contains up to 85 wt. % of fibrous reinforcing material, based on the weight of the insert.

The method according to any one of the previous eight paragraphs, wherein the insert contains from 30 wt. % to 85 wt. % of fibrous reinforcing material, based on the weight of the insert.

The method according to any one of the previous nine paragraphs, wherein the mining screen insert has a maximum deflection under load comparable to that of a steel mining screen insert.

What is claimed is:

1. A composite mining screen comprising:
   a cast elastomer frame encapsulating a pultruded composite mining screen insert, wherein the insert contains up to 85 wt. % fibrous reinforcing material, based on the weight of the insert, and wherein a polyol component of the cast elastomer contains polymer regrind.

2. The composite mining screen according to claim 1, wherein the polymer regrind is selected from the group consisting of polyurethane, polycarbonate (PC), co-polycarbonate, polyestercarbonate, copolyestercarbonate, siloxane-polycarbonate, siloxane-copolycarbonate, polyester, co-polyester, polyvinyl chloride, co-polyvinyl chloride, polymethylmethacrylate, co-polymethylmethacrylate, polypropylene (PP), cyclic olefin copolymer (COC), fluoropolymers, thermoplastic olefin, styrene acrylonitrile, thermoplastic polyurethane, and blends of these materials.

3. The composite mining screen according to claim 1, wherein the cast elastomer is selected from the group consisting of polyurethane, thermoplastic polyurethane, natural rubber, neoprene rubber, styrene-butadiene rubber, and acrylonitrile butadiene rubber.

4. The composite mining screen according to claim 1, wherein the fibrous material is selected from the group consisting of glass fibers, glass mats, carbon fibers, polyester fibers, natural fibers, aramid fibers, nylon fibers, basalt fibers, and combinations thereof.

5. The composite mining screen according to claim 1, wherein the fibrous material comprises glass fibers.

6. The composite mining screen according to claim 1, wherein the polyol component of the cast elastomer contains up to 40 wt. % of polymer regrind, based on the weight of the polyol component.

7. The composite mining screen according to claim 1, wherein the composite mining screen insert has a maximum deflection under load comparable to that of a steel mining screen insert.

8. A process of producing the composite mining screen according to claim 1, the process comprising:
   placing a pultruded composite insert into a mining screen mold sized and shaped to receive the insert;
   adding polymer regrind to a polyol component of a cast elastomer solution,
   filling the mold with the cast elastomer solution and encapsulating the insert in the cast elastomer solution;
   curing the cast elastomer solution to form a new composite mining screen.

9. The process according to claim 8, wherein the polymer regrind is obtained from a used composite mining screen.

10. The process according to claim 8, wherein the cast elastomer contains from up to 40 wt. % of the polymer regrind, based on the weight of the polyol component of the cast elastomer.

11. The process according to claim 8, wherein the polymer regrind is selected from the group consisting of polyurethane, polycarbonate, co-polycarbonate, polyestercarbonate, copolyestercarbonate, siloxane-polycarbonate, siloxane-copolycarbonate, polyester, co-polyester, polyvinyl chloride, co-polyvinyl chloride, polymethylmethacrylate, co-polymethylmethacrylate, polypropylene, cyclic olefin copolymer, fluoropolymers, thermoplastic olefin, styrene acrylonitrile, thermoplastic polyurethane, and blends of these materials.

12. The process according to claim 8, wherein the fibrous reinforcing material is selected from the group consisting of glass fibers, glass mats, carbon fibers, polyester fibers, natural fibers, aramid fibers, nylon fibers, basalt fibers, and combinations thereof.

13. The process according to claim 8, wherein the new pultruded composite mining screen insert has a maximum deflection under load comparable to that of a steel mining screen insert.

14. A method of recycling a composite mining screen, the method comprising:
grinding the used composite mining screen according to claim 1 into polymer regrind particles;
coating a fibrous reinforcing material with a liquid polymer mixture;
pulling the fibrous reinforcing material with coating applied thereto through a pultrusion die;
cutting and curing the fibrous reinforcing material to form a new pultruded composite mining screen insert;
placing the new pultruded composite mining screen insert into a mining screen mold sized and shaped to receive the insert;
adding the polymer regrind particles to a cast elastomer solution;
filling the mining screen mold with the cast elastomer solution and encapsulating the new pultruded composite mining screen insert in the cast elastomer solution; and
curing the cast elastomer solution to form a new composite mining screen.

15. The method according to claim 14, wherein the polymer regrind and the liquid polymer are independently selected from the group consisting of polyurethane, polycarbonate, co-polycarbonate, polyestercarbonate, copolyestercarbonate, siloxane-polycarbonate, siloxane-copolycarbonate, polyester, co-polyester, polyvinyl chloride, co-polyvinyl chloride, polymethylmethacrylate, co-polymethylmethacrylate, polypropylene, cyclic olefin copolymer, fluoropolymers, thermoplastic olefin, styrene acrylonitrile, thermoplastic polyurethane, phenolics, epoxy compounds, and blends of these materials.

16. The method according to claim 14, wherein the cast elastomer is selected from the group consisting of polyurethane, thermoplastic polyurethane, natural rubber, neoprene rubber, styrene-butadiene rubber, and acrylonitrile butadiene rubber.

17. The method according to claim 14, wherein the fibrous material is selected from the group consisting of glass fibers, glass mats, carbon fibers, polyester fibers, natural fibers, aramid fibers, nylon fibers, basalt fibers, and combinations thereof.

18. The method according to claim 14, wherein the fibrous material comprises glass fibers.

19. The method according to claim 14, wherein the polyol component of the cast elastomer contains up to 40 wt. % of polymer regrind, based on the weight of the polyol component.

20. The method according to claim 14, wherein the composite mining screen insert has a maximum deflection under load comparable to that of a steel mining screen insert.

* * * * *